United States Patent [19]

Knoedler et al.

[11] Patent Number: 5,280,635
[45] Date of Patent: Jan. 18, 1994

[54] BABY MONITOR TRANSMITTER

[75] Inventors: Roy E. Knoedler; Ted F. Kelley, both of Boulder; Jack W. Renforth, Aurora, all of Colo.

[73] Assignee: Gerry Baby Products Company, Denver, Colo.

[21] Appl. No.: 754,563

[22] Filed: Sep. 4, 1991

[51] Int. Cl.⁵ ............................................. H04B 1/034
[52] U.S. Cl. .................................. 455/128; 455/129; 455/351; 224/269
[58] Field of Search .................. 455/128, 66, 90, 349, 455/269, 129, 344, 347, 348, 350, 351; 343/702, 741; 224/269, 252; 24/459, 528, 3; 379/388, 420, 433, 449, 450, 455, 426; 361/417, 419; 200/61.85

[56] References Cited

U.S. PATENT DOCUMENTS

| | | | |
|---|---|---|---|
| D. 283,816 | 5/1986 | Cutler | D14/68 |
| D. 283,892 | 5/1986 | Cutler | D14/68 |
| D. 310,218 | 8/1990 | Murphy | D14/137 |
| D. 310,664 | 9/1990 | Murphy | D14/137 |
| 2,388,567 | 11/1945 | Patterson, Jr. | 343/702 |
| 3,510,923 | 5/1970 | Blake | 24/528 |
| 4,004,228 | 1/1977 | Mullett | 325/113 |
| 4,461,033 | 7/1984 | Todo | 455/78 |
| 4,897,898 | 2/1990 | Chapin | 24/3 J |
| 4,976,721 | 12/1990 | Blasnik et al. | 24/528 |
| 5,014,346 | 5/1991 | Phillips et al. | 455/90 |

FOREIGN PATENT DOCUMENTS

| | | |
|---|---|---|
| 3741189 | 1/1990 | Australia . |
| 0298759 | 1/1989 | European Pat. Off. ............ 455/90 |
| 3841675 | 6/1990 | Fed. Rep. of Germany . |
| 2200517 | 8/1988 | United Kingdom . |
| 9013951 | 11/1990 | World Int. Prop. O. . |

OTHER PUBLICATIONS

Terk Technologies, FAM Instruction Manual, Apr. 1991, pp. 1 and 2.

*Primary Examiner*—Reinhard J. Eisenzopf
*Assistant Examiner*—Lhi Pham
*Attorney, Agent, or Firm*—Biebel & French

[57] ABSTRACT

A baby monitor transmitter is provided for use in combination with a receiver unit. The transmitter includes an arcuately shaped antenna which conforms to an arcuate shape of an upper edge of the transmitter housing. The antenna may be pivoted outwardly away from the housing to a plurality of predetermined positions. In addition, the transmitter includes a clip member which may be used to hang the transmitter on various supporting surfaces. The clip member includes a vertical leg extending parallel to a rear surface of the transmitter and the vertical leg may be moved toward and away from the housing in order to accommodate supporting structures of different sizes.

7 Claims, 6 Drawing Sheets

BABY MONITOR TRANSMITTER

BACKGROUND OF THE INVENTION

The present invention relates to a baby monitor and, more particularly, to a transmitter for use in combination with a receiver to monitor the sounds made by a baby.

Baby monitors are increasingly used by parents to monitor a baby while the parent goes to a different location away from the baby such as a different room or outside of the house while the baby is sleeping. The typical baby monitor includes a transmitter or baby unit and a receiver or parent unit wherein the baby unit transmits sounds from the baby to the parent unit and, in some monitoring systems, the parent unit may also transmit the parent's voice to the baby unit.

In known prior art baby monitoring units, the unit is designed to lay flat on its back on a table, or in some instances, also be mounted to a wall. Further, it is known to provide both the baby and parent unit with volume adjustment knobs whereby the sound being transmitted by the baby unit must be above a certain level and the loudness of the sound emitted by the parent unit may be controlled.

It is also known to provide an LED display such that the audio transmission on the parent unit may be shut off and a series of LED lights will light up on the planar front face of the parent unit wherein the number of LED lights displayed will correspond to the loudness of the sound being transmitted by the baby unit.

In the use of prior art baby monitoring systems, there has been a need for baby units which may be mounted in a greater variety of locations as well as units which have a great ease of portability.

SUMMARY OF THE INVENTION

The present invention provides a transmitter for use in monitoring a baby wherein the transmitter includes a housing defining front and rear faces or sides connected by upper and lower edges and opposing first and second lateral edges.

An antenna is provided extending between the first and second lateral edges and includes opposing end portions extending into the housing adjacent to the lateral edges. The end portions are attached to the housing by pivotal mounting means which support the antenna for pivotal movement outwardly away from the housing.

In addition, a clip member is provided having a horizontal extension portion extending through an aperture in the rear side of the housing, and a vertical portion extends from the horizontal portion substantially parallel to the rear side whereby the clip member in combination with the rear side forms a U-shaped support structure for engaging the upper edge of a vertical support member such as the upper edge of a crib or play yard. The clip member is adjustable relative to the rear side of the housing such that the spacing between the vertical portion and the rear side of the housing may be varied to accommodate different thicknesses of supporting members.

Other objects and advantages of the invention will be apparent from the following description, the accompanying drawings, and the appended claims.

DETAILED DESCRIPTION OF THE PREFERRED EMBODIMENTS

Figure 1:
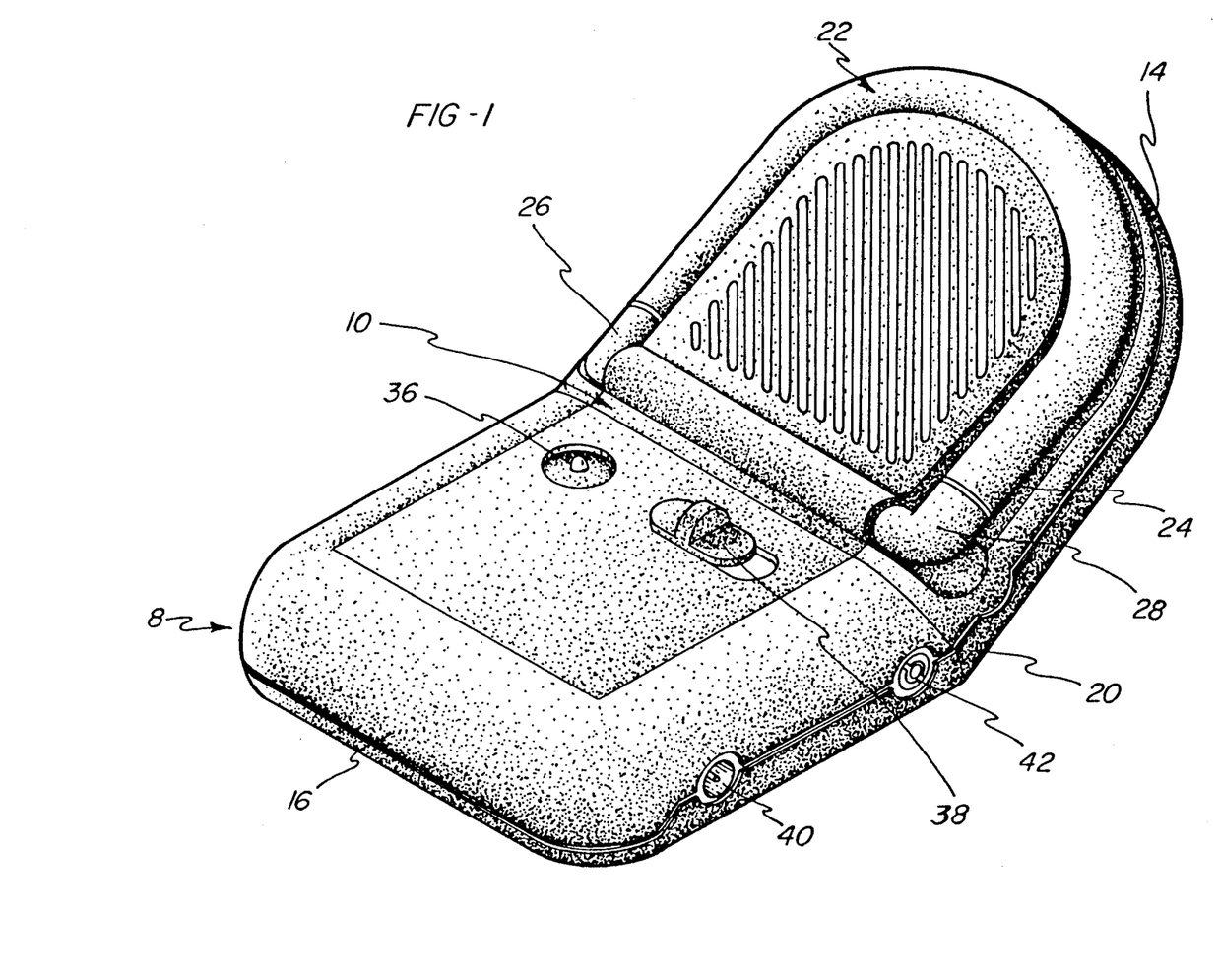
FIG. 1 is a perspective view of the transmitter unit of the present invention
Figure 2:
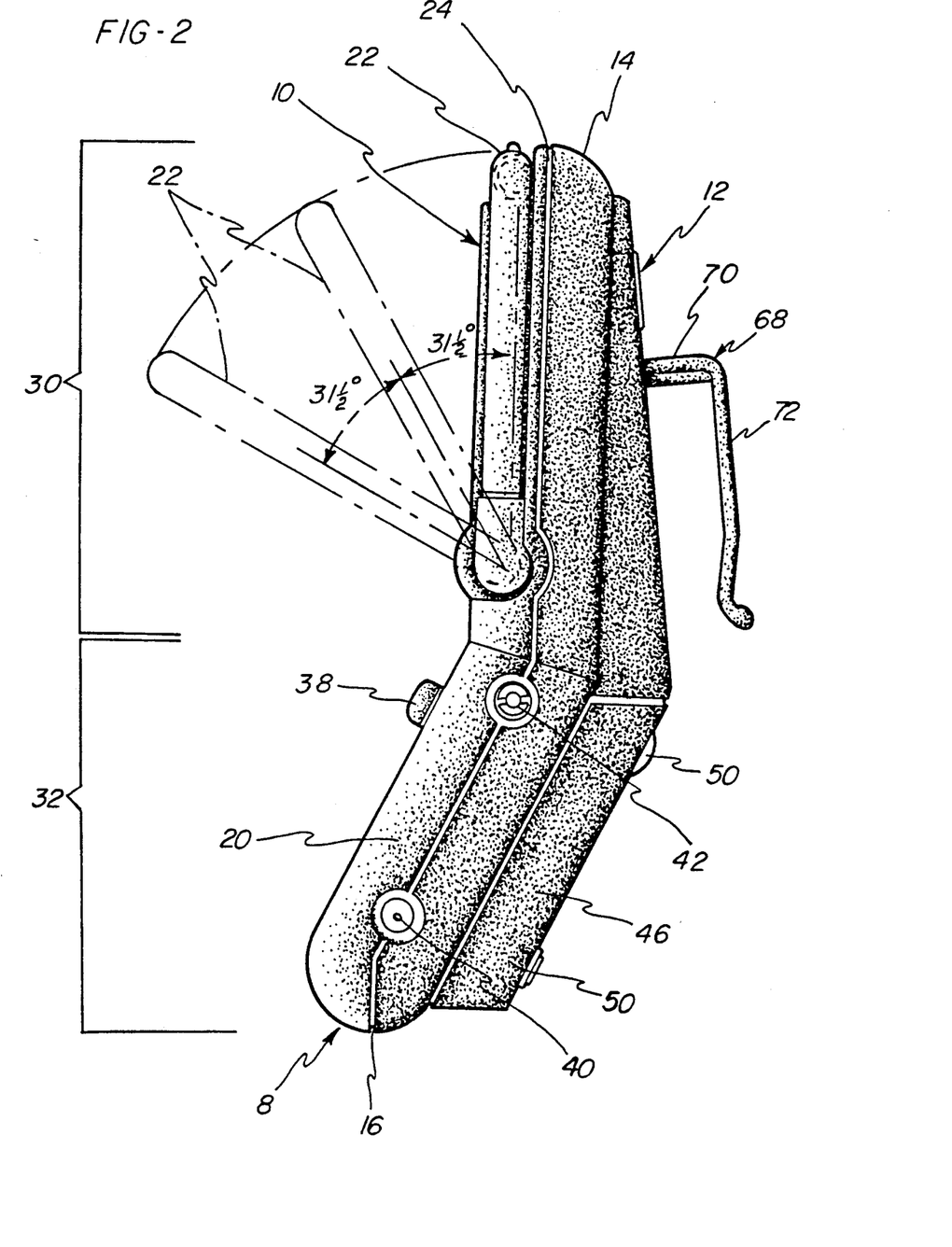
FIG. 2 is a side elevational view of the transmitter unit showing the different positions for the antenna.
Figure 3:
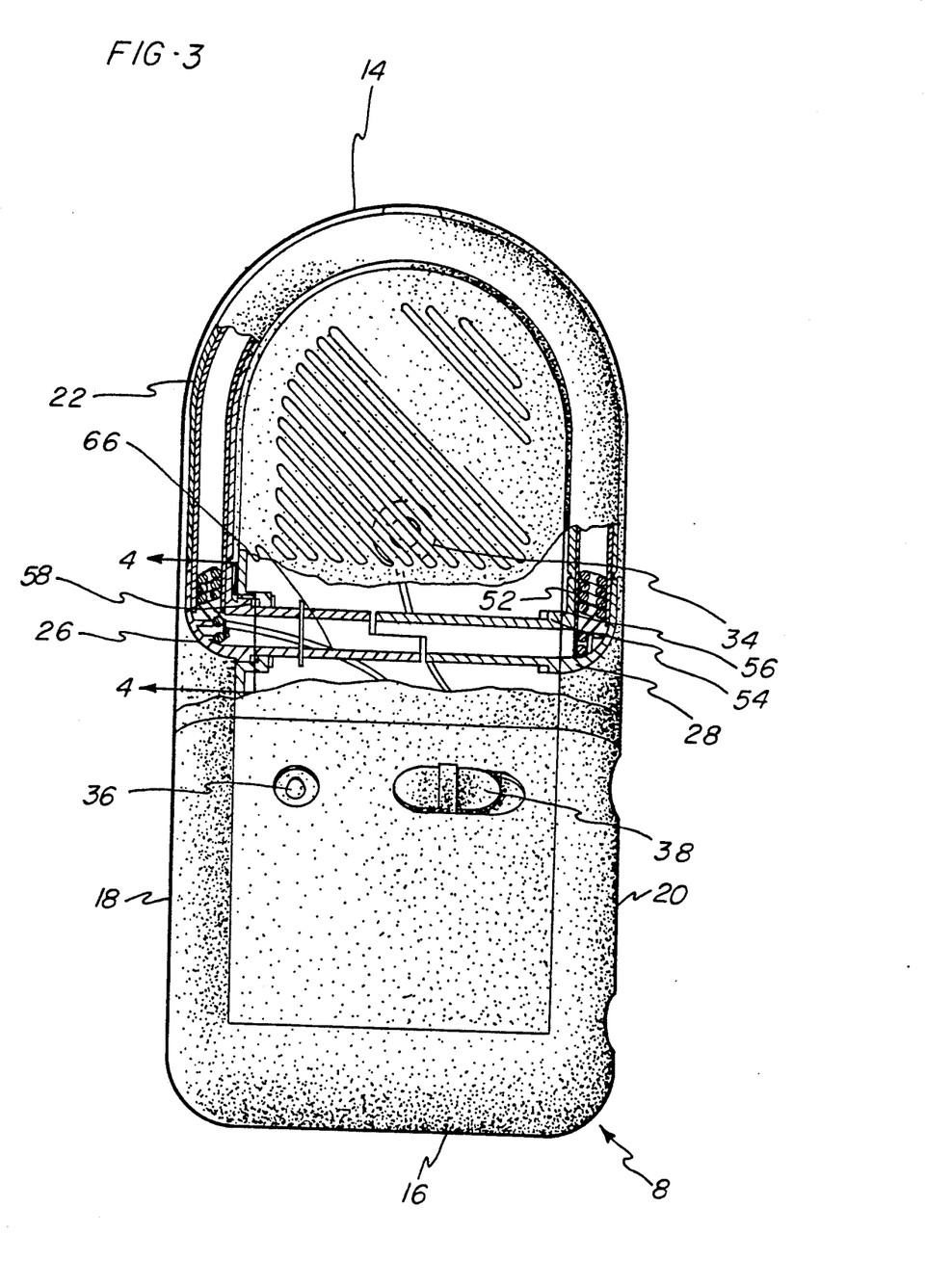
FIG. 3 is a partially cut-away front side view showing the pivot mechanism for the antenna.

Referring to FIGS. 1-3, the transmitter of the present invention includes housing 8 having a front side 10, a rear side 12, opposing upper and lower edges 14, 16 and opposing first and second lateral edges 18, 20 wherein the edges 14, 16, 18, 20 connect the front and rear sides 10, 12.

In addition, an antenna 22 is provided positioned within a groove 24 formed adjacent to the intersection between the upper edge 14 and the front face 10 as well as extending into the lateral sides 18, 22. It should be noted that the upper edge 14 is formed having an arcuate shape extending between the first and second lateral sides 18, 20 and that the antenna 22 has a shape matching and extending parallel to the upper edge 14. Further, the antenna 22 includes opposing first and second ends 26, 28 which extend into the front housing portion 10.

It should also be noted that the housing 8 is formed having an upper section 30 and a lower section 32, as shown in FIG. 2, wherein the upper and lower sections 30, 32 are disposed at an obtuse angle relative to each other, which angle is preferably 153°. The lower section 32 carries electronic circuitry for processing signals received through a microphone 34 located adjacent to an aperture in the front side 10 (see FIG. 3) and for transmitting a signal to the parent receiver unit through the antenna 22. The electronic circuitry used in the present invention for transmitting the signal to the receiver unit is standard and similar to prior art transmitter units, and the particulars of the circuitry form no part of the present invention.

The lower housing portion 32 also carries a power indicator LED 36, an on-off switch 38, an outlet 40 for receiving power from an AC outlet, an outlet 42 for providing a direct wire connection to the parent receiver unit and a switch 44 (see FIG. 6) for selecting one of two preset FM channels for the transmitter unit to operate on.

Figure 5:
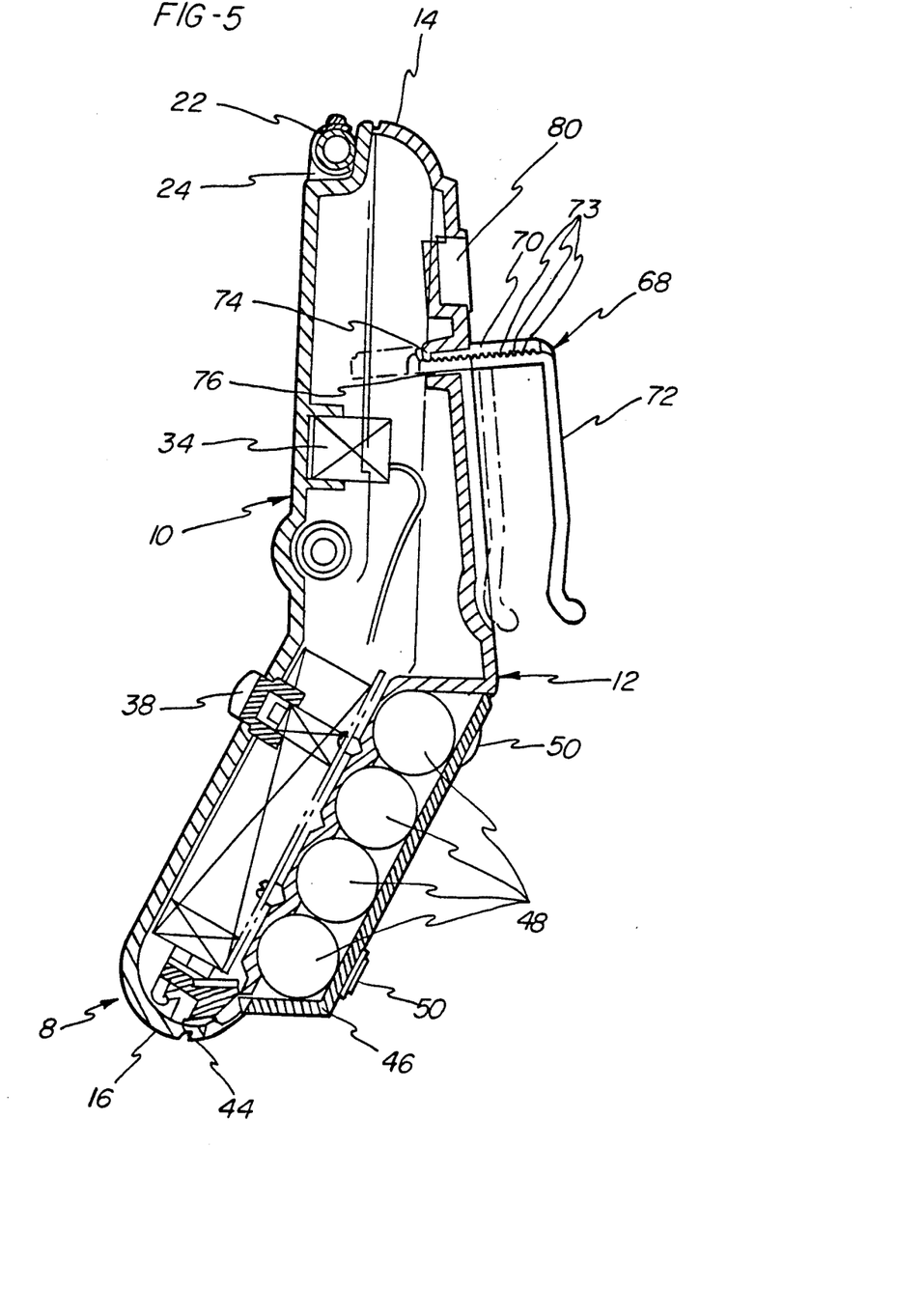
FIG. 5 is an elevational partially cut-away sectional view showing the mechanism for adjusting the spacing of the clip member from the rear side of the housing.
Figure 6:
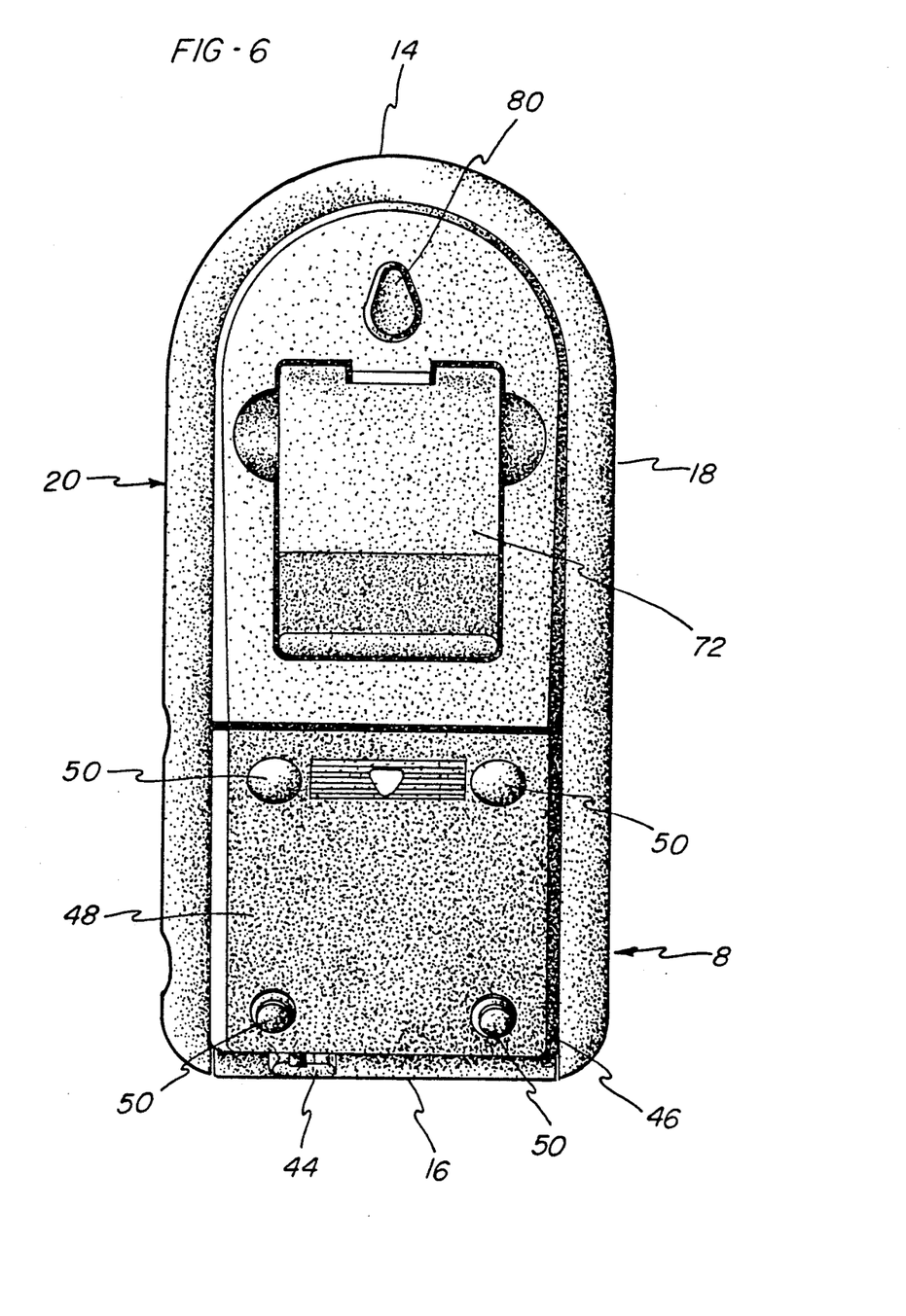
FIG. 6 is a rear view of the housing.

In addition, the lower portion 32 includes a base portion 46 forming a battery compartment for carrying four AA batteries 48, as shown in FIG. 5. The battery compartment 46 includes a compartment cover 48 having four pad members 50 for engaging a table top surface, as best seen in FIG. 6.

As shown in FIG. 2, the antenna 22 may be pivoted outwardly away from the front side 10 of the upper portion 30 to two predetermined angular positions of either 31½° or 63°. When the unit is resting on its pads 50 and the antenna is positioned at the 63° angle, the antenna 22 will be oriented at a perpendicular angle relative to the supporting surface that the pads 50 are resting on. The various positions for the antenna 22 are provided to improve the signal transmitted for any given position of the transmitter housing.

As may be seen in FIG. 3, the antenna 22 carries an antenna wire 52 within its interior. The second end 28 of the antenna 22 extends through an aperture in the upper housing portion 30 and includes a shoulder portion 54 for engaging an inner edge 56 of the housing whereby the end 28 is held in place against lateral movement while being permitted to undergo pivotal movement relative to the upper housing portion 10.

Figure 4:
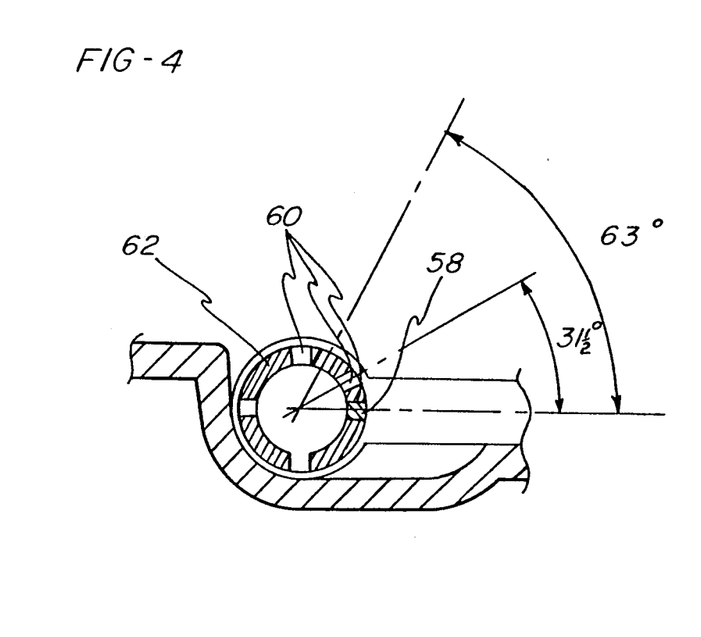
FIG. 4 is a sectional view taken along line 4—4 in FIG. 3 to show the detent and recess portion of the pivot mechanism for the antenna.

The first antenna end 26 includes a detent member 58 which is adapted to engage within recesses 60 formed in a ledge member 62 of the housing 8 as illustrated in FIGS. 3 and 4. Thus, the recesses 60 define positive stopping positions for the detent 58 whereby the antenna 22 may be positively located at predetermined angular positions relative to the front housing face 10 as the detent 58 moves with the antenna 22.

The first end 26 of the antenna 22 further includes a sleeve 64 and a coil spring 66 positioned between the sleeve 64 and the ledge portion 62. The spring 66 biases the first end 26 into the housing 8 such that the detent 58 will be biased to positive engagement within the recesses 60.

Referring now to FIGS. 5 and 6, the transmitter unit further includes a clip member 68 having a horizontal extension 70 and a vertical extension 72 extending downwardly from the horizontal extension 70 and parallel to the upper rear housing face 12. The horizontal extension 70 includes a plurality of grooves 73 in an upper surface thereof. In addition, the housing 8 includes a pawl member 74 for engaging within the grooves as the horizontal member 70 extends through an aperture 76 defined in the rear side 12 of the housing 8.

The clip member 68 may be moved into and out of the housing 8 with the pawl member 74 engaging the various grooves 73 to position the vertical extension 72 at a plurality of preselected positions as determined by the cooperating pawl member 74 and grooves 73. Thus, the clip member 68 in combination with the rear housing side 12 defines a U-shaped engagement portion which may be positioned on the upper edge of a support structure, and the width of the opening for engaging the support structure may be varied depending on the width of the support structure.

In other words, the clip member 68 may be positioned into the housing 8 such that a narrow space is defined between the vertical extension 72 and the rear housing side 12 to locate the transmitter unit on a thin support structure, such as might be provided by an upper edge of an outer pocket on a diaper bag. Alternatively, the clip member 68 may be moved outwardly away from the rear face 12 in order to allow the unit to be supported on a wider support structure such as might be provided by the upper edge of a crib or by a rail on a playpen.

In addition, the unit may be supported on a horizontal surface by resting the unit with its pads 50 on the surface. In this use of the unit, the batteries 48 provide a weight for maintaining the lower portion 32 of the unit in place such that the unit will be less likely to tip back with the lower portion 32 lifting up.

It should also be noted that the present unit includes an additional aperture 80 in its back side 12 for receiving a fastener engaged in a vertical wall whereby the unit may be hung from a vertical surface.

From the above description, it should be apparent that the present transmitter unit is adapted to be used in a variety of locations such that the unit may be rested on a horizontal surface, supported from a vertical surface, or hung from a supporting structure. In addition, it should be apparent that the unit also provides a convenient means for adjusting the antenna outwardly away from the housing whereby the reception by the receiving unit may be improved.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A transmitter for use in monitoring a baby, said transmitter comprising:
   a housing defining front an rear sides,
   opposite upper and lower edges and opposing first and second lateral edges connecting said front and rear sides,
   an antenna portion extending between said first and second lateral edges, said antenna portion including opposing end portions extending into said housing adjacent to said lateral edges,
   pivotal mounting means adjacent to said antenna portion ends for mounting said antenna portion ends to said housing for pivotal movement whereby said antenna portion may be pivoted outwardly away from said housing, and
   wherein said housing defines upper and lower portions located adjacent to said upper and lower edges, respectively, said upper and lower portions being disposed at an obtuse angle relative to each other, said antenna portion being attached to said upper portion.

2. The transmitter of claim 1, said housing further including means defining a battery compartment in said rear side and within said lower portion, said battery compartment being adapted to receive a plurality of double A batteries.

3. A transmitter for use in monitoring a baby, said transmitter comprising:
   a housing defining front and rear sides,
   opposing upper and lower edges and opposing first and second lateral edges connecting said front and rear sides,
   means defining an aperture in said rear side,
   a clip member including a horizontal extension member extending through said aperture and a vertical member extending substantially parallel to said rear side, said extension member including a surface having a plurality of grooves formed therein and being mounted for sliding movement into and out of said aperture in a direction perpendicular to said rear side, and
   pawl means attached to said housing for engaging said grooves in said extending member whereby said vertical member may be selectively positioned at a plurality of predetermined positions spaced from said rear side of said housing.

4. The transmitter of claim 3, including an antenna portion extending between said first and second lateral edges, said antenna portion including opposing end portions extending into said housing adjacent to said lateral edges and pivotal mounting means adjacent to said antenna portion ends for mounting said antenna portion ends to said housing for pivotal movement whereby said antenna portion may be pivoted outwardly away from said housing.

5. The transmitter of claim 4, wherein said pivotal mounting means adjacent to one of said antenna portion ends includes cooperating detent and recess means, said detent and recess means being movable relative to each other during said pivotal movement of said antenna portion whereby discrete angularly spaced positions are defined for said antenna portion.

6. The transmitter of claim 5, including resilient means located inside said housing for resiliently biasing said detent and recess means into cooperating engagement whereby said antenna portion is temporarily prevented from pivoting in an angular direction relative to said housing.

7. A transmitter for use in monitoring a baby, said transmitter comprising:
 a housing defining front and rear faces,
 upper and lower housing portions oriented at an obtuse angle relative to each other,
 a peripheral upper edge of said housing connecting a first front face portion of said housing with said first rear face portion, said upper edge including opposing parallel surfaces connected by an arcuate portion,
 a groove formed in said first front face portion positioned adjacent to and extending parallel to said upper edge,
 an antenna including first and second parallel legs connected by an arcuate section, said antenna adapted to be received within said groove,
 first and second pivot connections for connecting an end of each of said legs to said housing for pivotal movement, one of said pivot connections including cooperating detent and recess means whereby said detent means may move to a plurality of positions relative to said recess means to define different predetermined positions for said antenna,
 coil spring means for biasing said detent and recess means into cooperating engagement with each other,
 means defining an aperture in said front face for permitting passage of sound from a point exterior of said housing to a microphone located within said housing,
 means defining an aperture in said rear face,
 a belt clip member including a vertical leg extending along said rear face and a horizontal leg slidably received through said aperture in said rear face, said horizon leg having a plurality of grooves formed in a surface thereof, and
 pawl means attached to said housing adjacent to said aperture in said rear face for engaging said grooves in said surface of said horizontal leg whereby said vertical leg may be located in a plurality of predetermined positions in spaced relation to said rear face.

* * * * *

UNITED STATES PATENT AND TRADEMARK OFFICE
CERTIFICATE OF CORRECTION

PATENT NO. : 5,280,635

DATED : January 18, 1994

INVENTOR(S) : Roy E. Knoedler, Ted F. Kelley and Jack W. Renforth

It is certified that error appears in the above-identified patent and that said Letters Patent is hereby corrected as shown below:

Claim 1, Col. 4, line 21, delete "an" and insert —and—; line 22, delete "opposite" and insert —opposing—.

Claim 7, Col. 6, line 25, delete "horizon" and insert —horizontal—.

Signed and Sealed this

Twenty-eighth Day of June, 1994

*Attest:*

BRUCE LEHMAN

*Attesting Officer*     *Commissioner of Patents and Trademarks*